US010899376B2

(12) United States Patent
Bauer et al.

(10) Patent No.: US 10,899,376 B2
(45) Date of Patent: Jan. 26, 2021

(54) ELECTRICALLY POWERED TRANSPORT CART COMBINATION FOR AN AIRCRAFT CABIN

(71) Applicant: Airbus Operations GmbH, Hamburg (DE)

(72) Inventors: Michael Bauer, Hamburg (DE); Norbert Kaufeld, Hamburg (DE); Matthias Reiss, Hamburg (DE); Oliver Kiehne, Hamburg (DE); Simon Stock, Bremen (DE); Rafael Mortensen Ernits, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 224 days.

(21) Appl. No.: 16/136,903

(22) Filed: Sep. 20, 2018

(65) Prior Publication Data
US 2019/0084604 A1 Mar. 21, 2019

(30) Foreign Application Priority Data

Sep. 20, 2017 (DE) .......................... 10 2017 121 846

(51) Int. Cl.
*B62B 5/00* (2006.01)
*B64D 11/00* (2006.01)
(Continued)

(52) U.S. Cl.
CPC .............. *B62B 5/005* (2013.01); *A47B 31/06* (2013.01); *B62B 3/008* (2013.01); *B62B 5/00* (2013.01);
(Continued)

(58) Field of Classification Search
CPC ........... B62B 5/005; B62B 3/008; B62B 5/00; B62B 5/0069; B62B 5/0414;
(Continued)

(56) References Cited

U.S. PATENT DOCUMENTS 4,077,535 A * 3/1978 Oriol .................... A61G 12/001
180/14.1
4,655,669 A * 4/1987 Anttila .................. B65D 90/18
414/458

(Continued)

FOREIGN PATENT DOCUMENTS

DE 26 21 021 A1 12/1976
DE 92 17 666 U1 5/1993
(Continued)

OTHER PUBLICATIONS

European Search Report for Application No. 18195772.1 dated Feb. 18, 2019.
(Continued)

*Primary Examiner* — Ruth Ilan
*Assistant Examiner* — Marlon A Arce
(74) *Attorney, Agent, or Firm* — Jenkins, Wilson, Taylor & Hunt, P.A.

(57) ABSTRACT

An electrically driven trolley combination for an aircraft cabin with an independently usable, manually movable trolley and an electrical operating apparatus. The trolley has a base section, a main section extending from the base section, and wheels with the trolley supported on a cabin floor by the wheels and manually movable over the cabin floor being pushed or pulled. The electrical operating apparatus can be detachably coupled to the trolley and has a frame, a driveable rolling device on the frame and by which the electrical operating apparatus can be supported on a cabin floor and rolled, a coupling apparatus on the frame for detachably coupling the electrical operating apparatus to the trolley and having an engagement section and a movement section, the engagement section being selectively movable between a first position and a second position by the
(Continued)

movement section, an electrical drive device, and a control device.

13 Claims, 5 Drawing Sheets

(51) Int. Cl.
*A47B 31/06* (2006.01)
*B62B 3/00* (2006.01)
*B62B 5/04* (2006.01)
*A47B 31/00* (2006.01)
*G05D 1/02* (2020.01)

(52) U.S. Cl.
CPC .......... *B62B 5/0069* (2013.01); *B62B 5/0414* (2013.01); *B64D 11/00* (2013.01); *B64D 11/0007* (2013.01); *A47B 2031/002* (2013.01); *B62B 5/0076* (2013.01); *B62B 2202/67* (2013.01); *G05D 1/0212* (2013.01)

(58) Field of Classification Search
CPC ... B62B 5/0076; B62B 2202/67; A47B 31/06; A47B 2031/002; B64D 11/00; B64D 11/0007; G05D 1/0212
See application file for complete search history.

(56) References Cited

U.S. PATENT DOCUMENTS

| | | | | |
|---|---|---|---|---|
| 7,712,558 B2* | 5/2010 | Helson | ................ | B62B 5/0079 180/19.1 |
| 7,871,234 B2* | 1/2011 | Yuyama | ............... | A61G 12/001 280/33.997 |
| 8,199,109 B2* | 6/2012 | Robbins | ............... | G05D 1/0016 345/161 |
| 2006/0024150 A1 | 2/2006 | Gregory | | |
| 2007/0172341 A1 | 7/2007 | Gregory | | |
| 2009/0294394 A1 | 12/2009 | Girlich | | |
| 2019/0230850 A1* | 8/2019 | Johnson | ............... | G05D 1/0088 |

FOREIGN PATENT DOCUMENTS

| | | |
|---|---|---|
| DE | 10 2012 108 118 A1 | 3/2014 |
| DE | 10 2016 107 451 A1 | 10/2016 |
| FR | 2 746 060 A1 | 9/1997 |

OTHER PUBLICATIONS

German Search Report for Application No. 10 2017 121 846.7 dated Oct. 11, 2018.

* cited by examiner

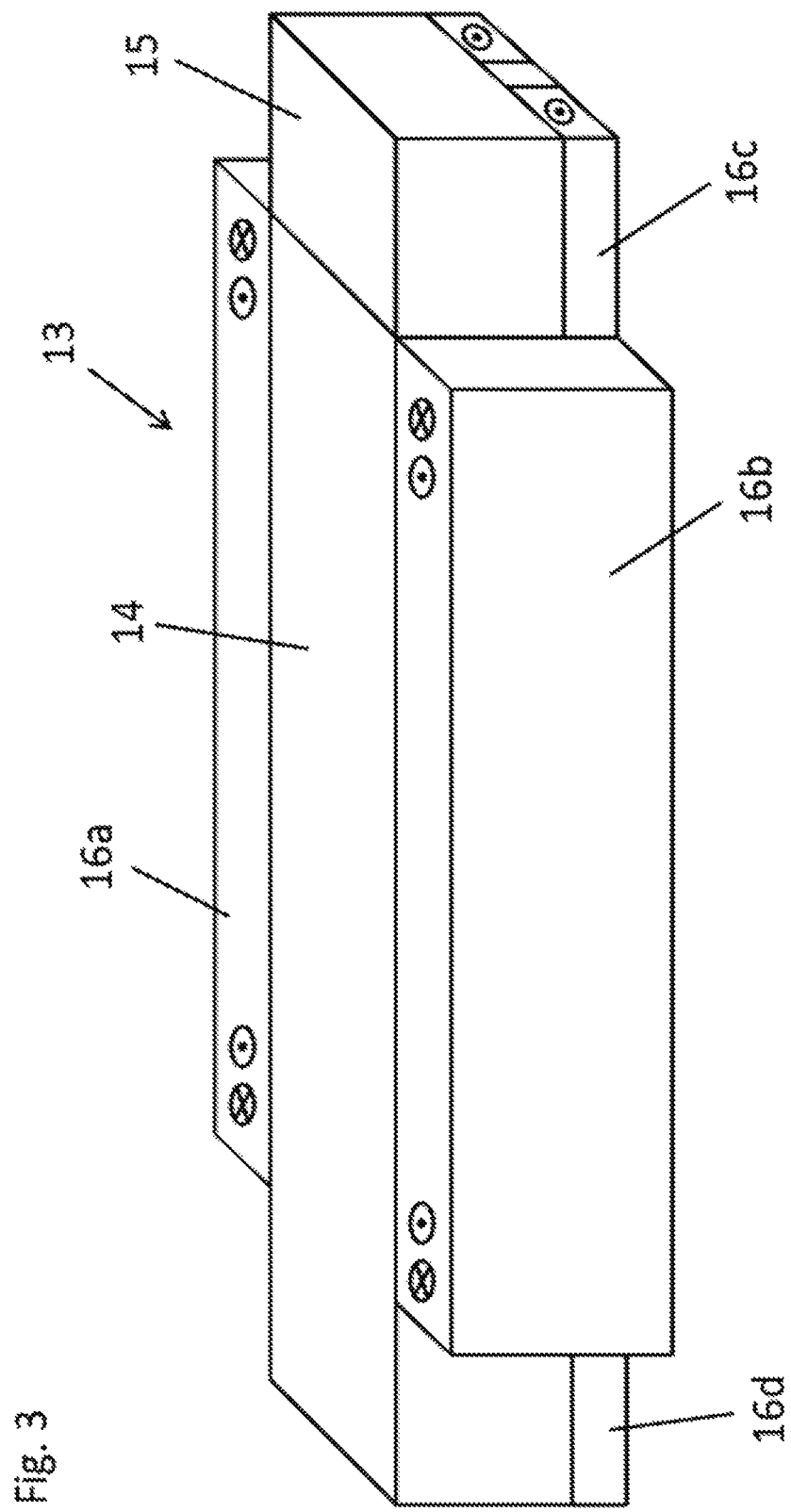

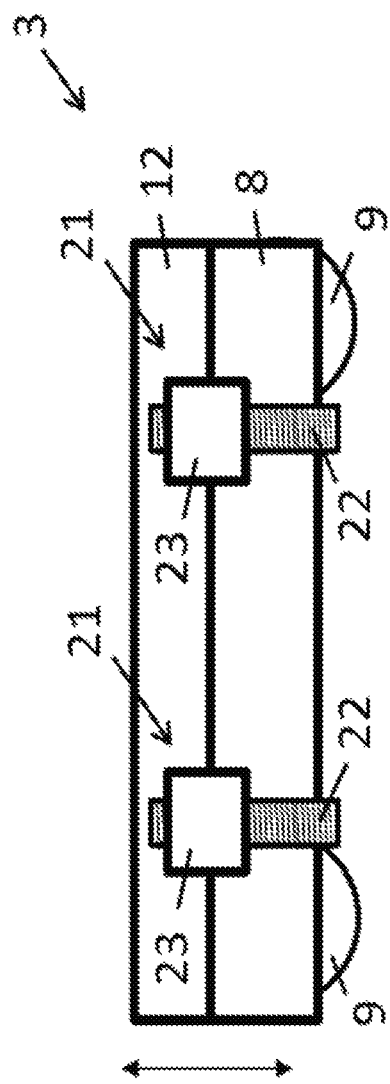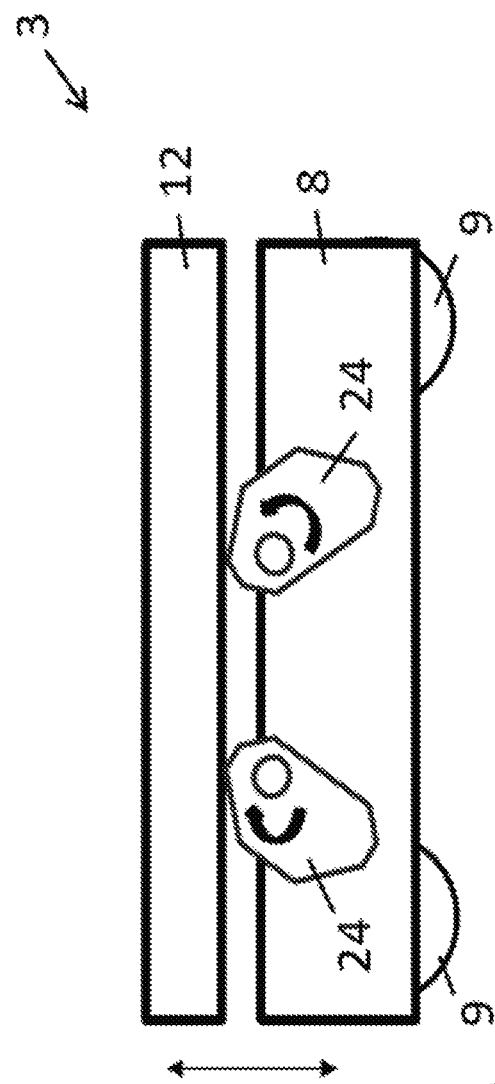
Fig. 4a
Fig. 4b

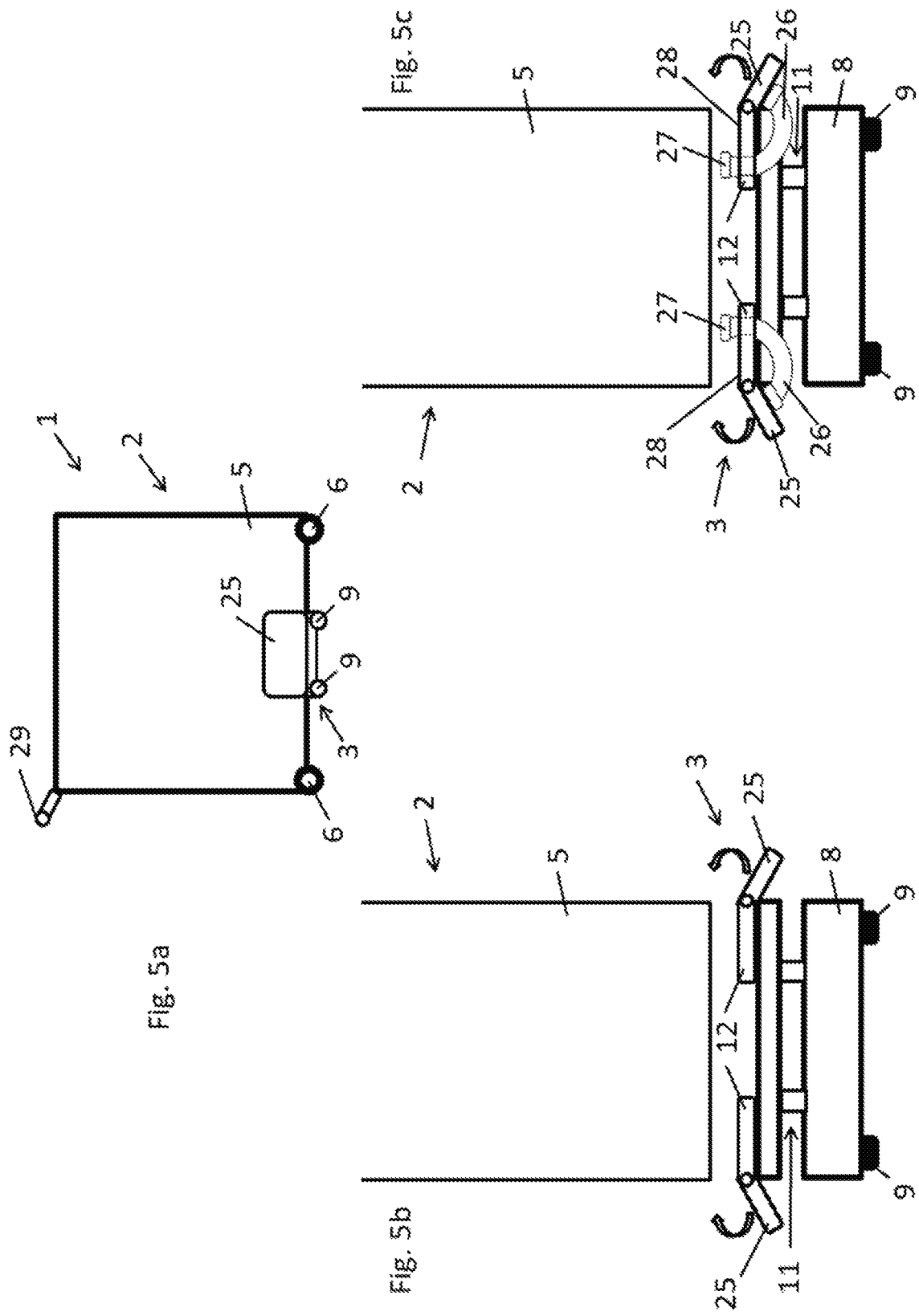

ELECTRICALLY POWERED TRANSPORT CART COMBINATION FOR AN AIRCRAFT CABIN

CROSS-REFERENCE TO RELATED APPLICATION

This application claims priority to German Patent Application No. 10 2017 121 846.7 filed Sep. 20, 2017, the entire disclosure of which is incorporated by reference herein.

TECHNICAL FIELD

The disclosure herein relates to an electrically driven transport or trolley combination for an aircraft cabin.

BACKGROUND

In passenger aircraft, manually movable transports or trolleys are usually used for on-board service during a flight. The trolleys are used, in particular, for supplying the passengers with food and drink, for collecting rubbish and empty trays or else for selling goods. The trolleys are stored in associated compartments in the galley and are pushed or pulled through the aircraft cabin to the individual passengers by the cabin crew during use. In the process, for safety purposes, the wheels of the trolley have to be locked each time it stops and have to be released again each time it is moved again in order to prevent undesired independent movement, for example as a result of movements of the aircraft. Furthermore, before and after the flights, the trolleys have to be loaded into the aircraft and stowed in the galley and, respectively, removed from the galley and unloaded from the aircraft by the ground crew.

Movable trolleys are known with many different dimensions since they are not standardized and different airlines use different trolleys. However, the trolleys typically have a weight of more than 100 kg for large trolleys and more than 60 kg for smaller trolleys. Therefore, manual pushing or pulling of the trolley by cabin crew is associated with considerable physical strain, wherein, to complicate matters, it should be noted that the aircraft can assume positions in which the cabin floor is inclined through up to approximately 3° in relation to the horizontal and that the trolley also has to be handled when turbulence occurs. In addition, a mechanical brake device has to be regularly operated and released again, this being time-consuming and strenuous for the cabin crew.

SUMMARY

An object of the disclosure herein is therefore to provide a movable trolley combination which can be operated by the cabin crew with less physical strain and in less time and which is simple and cost-effective in respect of construction and to use.

This object is achieved by an electrically driven trolley combination and the use of an electrical operating apparatus having features disclosed herein. Advantageous embodiments of the trolley combination are the subject matter of the respective dependent claims.

The disclosure herein provides an electrically driven trolley combination for an aircraft cabin, which trolley combination, in its entirety, can be used like a conventional trolley, but one which is provided with an electric drive, for use in an aircraft cabin, in particular for on-board service, that is to say, for example, as a trolley for the cabin crew to supply the passengers with food and drink, to collect rubbish and empty trays or else to sell goods. The trolley combination, which can therefore also be called an electrically driven trolley for an aircraft cabin, firstly has an independently usable, manually movable trolley for an aircraft cabin, which trolley is, in particular, a conventional trolley, as has been described above, and secondly an electrical operating apparatus which can be detachably coupled to the trolley. As will be explained further, the electrical operating apparatus is used, after being coupled to the trolley, to move the combination of trolley and operating apparatus in an electrically driven manner. Here, the operating apparatus provides the function of the electric drive, while the manually movable trolley continues to provide its on-board service functions.

The independently usable, manually movable trolley, simply referred to as trolley in the text which follows, has a base section with a bottom side, and a main section or main body which extends from the base section opposite to the bottom side. The main section, which can be entirely or partially integrally formed with the base section, usually has, for example, compartments for food and drink or for goods or a holding space for rubbish. The base section can be provided, for example, in the form of a base plate or a base frame. The trolley also has a plurality of wheels which protrude entirely or partially from the bottom side and are preferably fastened to the base section. The wheels are arranged such that the trolley is supported on a cabin floor by way of the wheels and can be manually moved over the cabin floor by being pushed or pulled, wherein the wheels then roll over the cabin floor, while the base section is at a distance from the cabin floor.

The electrical operating apparatus which can be detachably coupled to the trolley has a frame or supporting section, which can be constructed in one piece or in multiple pieces, and also a driveable rolling device which is mounted on the frame, a coupling apparatus which is mounted on the frame, an electrical drive device, and a control device.

The rolling device is adapted and arranged such that the electrical operating apparatus can be supported on a cabin floor by the rolling device and can be moved over the cabin floor in a rolling manner.

The coupling apparatus is adapted for detachably coupling the electrical operating apparatus to the trolley and has an engagement section and a movement section. The engagement section can be selectively moved between a first position and a second position by the movement section. The engagement section is further away from the frame in the second position than in the first position, specifically—as will be made clear—preferably in a direction perpendicular to the cabin floor after the operating apparatus is supported on a cabin floor by the rolling device. The engagement section can also have two or more separate partial engagement sections which can each be moved between the first and second position by the movement section.

The electrical drive device is adapted in order to drive the rolling device, that is to say in such a way that the electrical operating apparatus which is supported on a cabin floor by way of the rolling device is moved over the cabin floor. Here, the control device is adapted in order to control the electrical drive device or the operation thereof for driving the rolling device. The movement of the operating apparatus over the cabin floor is also controlled in this way.

Here, it is particularly preferred when the coupling apparatus is arranged and designed such that, after the trolley is supported on a cabin floor by way of the wheels, the electrical operating apparatus with the engagement section in the first position can be arranged beneath the base section of the trolley such that the electrical operating apparatus is supported on the cabin floor by way of the rolling device, and the engagement section faces the bottom side of the base section of the trolley, and the engagement section then engages with the base section by moving to the second position, wherein the coupling apparatus exerts a force, which is directed away from the cabin floor, onto the base section in the second position of the engagement section, the force at least partially relieving the weight load of the trolley from the plurality of wheels of the trolley, preferably by at least 50% of the weight. Because of the weight load being relieved, the operating section, which now supports at least a portion of the weight of the trolley combination by way of its rolling device, can efficiently move the trolley combination, and the trolley can rest securely on the engagement section. Here—and also independently of this preferred embodiment—it is particularly preferred when the dimensions of the operating device are selected such that the operating device does not protrude laterally beyond the base section of the trolley in the coupled state, that is to say when the operating device is located within the region defined by the projection of the base section onto the cabin floor. As a result, the trolley combination advantageously has the same (external) dimensions as the trolley, so that the trolley combination can be accommodated, for example, in an existing stowage area of a galley.

In other words, in this preferred refinement, the coupling apparatus with its engagement section in the first position can be arranged such that the operating apparatus can be pushed beneath the trolley with the rolling device of the operating apparatus in contact with the floor. The engagement section is then located between the cabin floor and the bottom side of the base section and is at a distance from the base section. The engagement section can then be moved upwards in the direction of the base section by the movement section, until the engagement section acts on the base section and exerts the described force. The coupling section can therefore also be called a lifting apparatus. However, it is preferred when the plurality of wheels of the trolley are only partially relieved of the weight load of the trolley, that is to say the trolley is not completely lifted away from the cabin floor and the wheels of the trolley are still in contact with the floor. Greater stability of the trolley combination is achieved in this way.

In any case, the operating apparatus is coupled to the trolley in this way with the aid of the coupling apparatus, so that the combination of trolley and operating apparatus can be electrically moved over the cabin floor by driving of the rolling device by the electrical drive device. By virtue of moving the engagement section from the second position to the first position, the operating apparatus is uncoupled from the trolley again, so that the operating apparatus can be moved away from the trolley and the trolley can be used independently like a conventional manually movable trolley. Because of the weight of the trolley which has to be at least partially supported by the engagement section, it is not necessary to provide a locking device between the engagement section and the base section, and therefore coupling is possible in a simple and quick manner. The engagement section could possibly be provided with a surface with a high coefficient of friction in order to prevent the base section from slipping on the engagement section. However, it is of course possible to provide a separate locking device. Such a locking device may comprise, for example, two plates or other locking elements, which are provided at opposite sides of the engagement section as part thereof and which are foldable or movable between a locking position, in which they laterally abut the main section of the trolley and clamp the main section between them, and a release position, in which they are spaced from the main section of the trolley. The folding or movement of the locking elements may be effected electrically, hydraulically, mechanically or manually. In particular in the latter case in may then also be advantageous to provide for one or multiple manually operable locking levers, by which the locking elements can be selectively retained in the locking position and possibly also in the release position.

The described trolley combination has the advantage that the expenditure of force and time by the cabin crew can be reduced and operator control can be simplified, this improving the ergonomics. Here, the existing manually movable trolley can continue to be used without modification, wherein the operating apparatus can be used with or adapted to trolleys of different dimensions. Handling of the trolleys by the ground crew when loading the trolleys into the aircraft and when unloading the trolleys from the aircraft requires equally little change, and the same goes for the stowage device for the trolley or the trolley combination in the galley.

During handling, it can be provided that, when unloading and loading trolleys, the operating apparatus remains in the aircraft and a battery which is provided in the operating apparatus is charged in the aircraft for example in the meantime. In this way, the ground crew are not burdened by the additional weight of the operating apparatus and the trolleys can be handled in exactly the same way as is customary. In addition, it is then no longer necessary for there to be an operating apparatus for each trolley. The operating apparatus is coupled to a trolley and detached from the trolley again on-board as required.

In a preferred embodiment, the trolley combination further has an electrical power supply device for supplying electrical power to the electrical drive device. The electrical power supply device can be, for example, a rechargeable or non-rechargeable battery. In the case of a rechargeable battery, a charging device may be provided, for example, for the purpose of charging the battery, into which charging device the operating apparatus is insertable for storing it during non-use and in which the operating apparatus is charged after the insertion. Such a charging device may, in particular, be configured in such a manner that it can be arranged in a floor or bottom region of a storage compartment for a conventional trolley or transport cart of the type described above, and that it then provides an insertion section for the operating apparatus and an upper support section on which a conventional trolley can be supported. It is then advantageously possible to dispose both the operating apparatus and a conventional trolley in a state, in which they are not coupled, at the same time within the storage compartment and enable charging of the battery in this condition. The insertion section is preferably located at the level or height of the floor of the aircraft or of the storage compartment, so that the operating apparatus can be inserted in a simple manner without having to lift it. However, it is also possible that only one power supply interface for connection to an external electrical power supply device is provided. For example, a power supply interface which receives inductive electrical energy from a power supply device which is arranged in the floor of a vehicle cabin can advantageously be provided.

In a preferred embodiment, the electrical drive device is further adapted in order to selectively brake the rolling device, that is to say to exert a braking force or a braking effect onto one or more rolling elements—such as, for example, wheels, rollers or balls—or to block the braking force or braking effect. To this end, the electrical drive device can be designed or configured such that it provides the braking effect when it or a part of it is switched off, such as, for example, one or more suitable electric motors for driving the rolling device, for example stepper motors. As an alternative, the electrical drive device can be designed such that it provides the braking effect when the electrical drive device or a part of it is actuated in a specific manner and has current applied to it, such as, for example, one or more electric motors for driving the rolling device, for example brushless motors. In each case, it can be provided that the braking operation and the operation of cancelling the braking effect are performed by the user making a command on the control device, for example by an operator control device as will be described further below. It is of course also possible that the electrical operating apparatus has one or more mechanical or manual hydraulic brakes or parking brakes as an alternative or in addition.

In this embodiment, the control device is further preferably adapted in order to control the electrical drive apparatus such that it automatically assists a movement of the trolley combination when the trolley combination is being pushed, and brakes the rolling device in the absence of pushing. The same then applies preferably when pulling. In other words, force assistance or an automatic start/stop function with automatic braking is provided, in a manner similar to that provided in electric bicycles.

In a preferred embodiment, the electrical drive device is further adapted in order to also electrically drive the movement section. To this end, the electrical drive device can have at least one first electric motor, such as, e.g., one or more first servo motors, for driving the rolling device and at least one second electric motor, such as, e.g., one or more second servo motors, for driving the movement section. As an alternative, the movements can also be performed by one or more common electric motors. The control device is then also adapted in order to control the operation of the electrical drive device for driving the movement section and therefore the movement of the engagement section between the first and the second position. However, in principle, it is also possible that the movement section can be manually, mechanically or hydraulically operated in order to move the engagement section between the first and second position.

In a preferred embodiment, the movement section of the coupling apparatus has one or more scissor lifting mechanisms. Therefore, the coupling apparatus overall can also be called scissor lifting platform(s) or scissor lift(s) or have components or a component of this kind, wherein the engagement section, which corresponds to the platform or lift, can however assume different forms and does not have to be provided as a (continuous) platform or lift. The design of the movement section with one or more scissor lifting mechanisms or as one or more scissor lifting mechanisms is particularly simple and robust.

In an alternative preferred embodiment the movement section of the coupling apparatus comprises one or more spindle lift elements, each comprising a spindle or screw which is movable in an axial direction. In that case, the coupling apparatus as a whole can be called spindle lifting platform(s) or can comprise such spindle lifting platforms or such a spindle lifting platform, wherein, however, the engagement section, which corresponds to the platform or lift, can assume different forms and does not have to be provided as a (continuous) platform or lift. The design of the movement section with one or more spindle lift elements is likewise particularly simple and robust. In this embodiment the electrical drive device is preferably adapted to also electrically drive the spindle lift elements, for example by the motors mentioned above or other motors.

In a further alternative preferred embodiment the movement section of the coupling apparatus comprises one or more hydraulic cylinders, one or more telescopic cylinders, one or more spiral cylinders or helical band actuators, or one or more rotatably supported and rotatably drivable cam disks, each engaging the engagement section in order to selectively move it upwardly or downwardly.

In a preferred embodiment, which can be combined with the embodiment in which the movement section has one or more scissor lifting mechanisms, one or more spindle lift elements, one or more hydraulic cylinders, one or more telescopic cylinders, one or more spiral cylinders or helical band actuators, or one or more rotatably supported and rotatably drivable cam disks, the engagement section has two L profiles which are at a distance from one another. The L profiles constitute two of the abovementioned partial engagement sections. The L profiles are adapted in order to act on two opposite edges of the base section in the second position of the engagement section. Here, it is possible to provide that the distance between the L profiles can be adjusted in order to adapt to trolleys of different width, or in order to clamp between them the trolley in the coupled state to obtain an (additional) locking effect. Adjustment or locking of this kind can be provided manually or else also electrically with the aid of the electrical drive device which, to this end, can have, for example, a further separate electric motor and, for example, one or more spindle elements along which at least one of the L profiles moves when the spindle elements are driven rotatingly. Irrespective of this, a dedicated scissor lifting mechanism, one or more dedicated spindle lift elements, one or more dedicated hydraulic cylinders, one or more dedicated telescopic cylinders, one or more dedicated spiral cylinders or helical band actuators, or one or more dedicated rotatably supported and rotatably drivable cam disks can be provided for each L profile for example, or the two L profiles can be moved by a common scissor lifting mechanism, one or more common spindle lift elements, one or more common hydraulic cylinders, one or more common telescopic cylinders, one or more common spiral cylinders or helical band actuators, or one or more common rotatably supported and rotatably drivable cam disks for example. It is also possible that an arm of the L profiles is constructed to be foldable in order to provide, for each L profile, a locking element as has been described above as part of a locking device.

In a preferred embodiment, the rolling device has a plurality of wheels, at least one wheel of which can be driven by the electrical drive device. To this end, the electrical drive device can have a hub motor for each driveable wheel for example. If the rolling device comprises multiple wheels, it is particularly preferred if the wheels or the rolling device are or is configured as part of an omnidirectional drive, so that the movement direction of the operating apparatus is controllable by suitably controlling or driving the individual wheels by the electrical drive device, without having to provide for a separate steering mechanism. Thereby, the operating apparatus can be constructed simpler, with less weight and with smaller dimensions. In the case of an omnidirectional drive, and also independent thereof, the wheels may advantageously be omni wheels or Mecanum wheels.

In a preferred embodiment which can be provided as an alternative or in addition to the preceding embodiment, the rolling device has a plurality of balls or rollers, at least one of which can be driven by the electrical drive device. The rolling device can be designed, for example, in the form of one or more ball mats or roller mats.

In a preferred embodiment, the control device has an operator control device or is connected to an operator control device using cables or without cables. The operator control device can be, for example, a remote operator control arrangement. In each case, the operator control device allows a user to influence the control function of the control device and therefore the operation of the electrical drive device and the entire operating apparatus. The operator control device can be designed as a portable manual operator control device or else be adapted in order to be fastened to the trolley. It can be provided that the operating apparatus and its movement—and therefore also the movement of the entire trolley combination—can be controlled with the aid of the operator control device, wherein the operator control device is then preferably a remote operator control arrangement. In other words, it can be provided that the trolley combination is moved solely with the aid of the operator control device, without any expenditure of force by the cabin crew. In this connection it is also advantageous if the operator control device is adapted to steer the operating apparatus —, and, thus, also the entire trolley combination —, wherein it is then particularly preferred if the rolling device configured as part of an omnidirectional drive, as has been described above. The operator control device may comprise, for example, a joystick. Alternatively or additionally it is possible that the operator control device comprises a device wearable on the body of the operator, or a wearable, and/or a smartwatch, which is or are adapted to sense translational and/or rotational movements of the operator—and, in particular, of a hand or arm of the operator—in space and/or muscle movements or contractions and to convert them into control signals for the control device for controlling the movement of the operating apparatus and preferably also steering it. Furthermore, it is alternatively or additionally possible that the operator control device comprises a pressure sensitive surface on a handle of the trolley and/or one or more pressure measuring elements or load cells coupled to the handle, so that pressing and pulling movements exerted by the operator are converted into control signals for the control device for controlling the movement of the operating apparatus and preferably also steering it. In this manner, the control of the movement of the trolley combination can take place largely without the operator noticing it, because the pushing and pulling movements exerted by the operator to the trolley, preferably including steering movements, are detected and supported by the operating apparatus.

In a preferred embodiment, the operating device has a status display, which is connected to the control device and can be actuated by the control device, for displaying operating states of the operating device, such as, for example, whether the operating device is coupled to the trolley or not, whether the rolling device is braked, is freewheeling or is driven, or a state of charge of a battery.

In a preferred embodiment, the electrical operating apparatus further has a sensor arrangement which can have, for example, one or more laser sensors and which is connected to the control device and is adapted in order to detect properties of the area surrounding the operating apparatus, and to supply sensor signals which are representative of the properties. The control device is further adapted in order to move the trolley combination independently along an aisle of an aircraft cabin on the basis of the sensor signals from the sensor arrangement. To this end, for example, guide devices which are detected by the sensor arrangement can be laid or provided along the aisle. In this embodiment, it is possible, for example, that the cabin crew only start and stop the movement of the trolley combination along the aisle with the aid of an operator control device of the abovementioned form, and that, after the movement is started and until the movement is next stopped, the trolley combination moves independently along the aisle. In this way, it is possible for the cabin crew to move the trolley combination from passenger to passenger in a particularly simple manner.

The above-described electrical operating apparatus as such can advantageously be used with an independently usable, manually movable trolley for an aircraft cabin in a trolley combination according to one of the above-described embodiments, that is to say it is adapted for this use.

BRIEF DESCRIPTION OF THE DRAWINGS

The disclosure herein will be explained in more detail below with reference to the figures which illustrate an exemplary embodiment.

FIG. 3 shows a schematic perspective view of a combined battery, sensor and control block of the electrical operating apparatus of FIGS. 1 and 2;

FIG. 4a shows a schematic side view of an embodiment of the disclosure herein having an alternative configuration of the movement devices;

FIG. 4b shows a schematic side view of an embodiment of the disclosure herein having a further alternative configuration of the movement devices; and FIGS. 5a-c show schematic side views of a trolley combination according to further embodiments of the disclosure herein.

DETAILED DESCRIPTION

Figure 1:
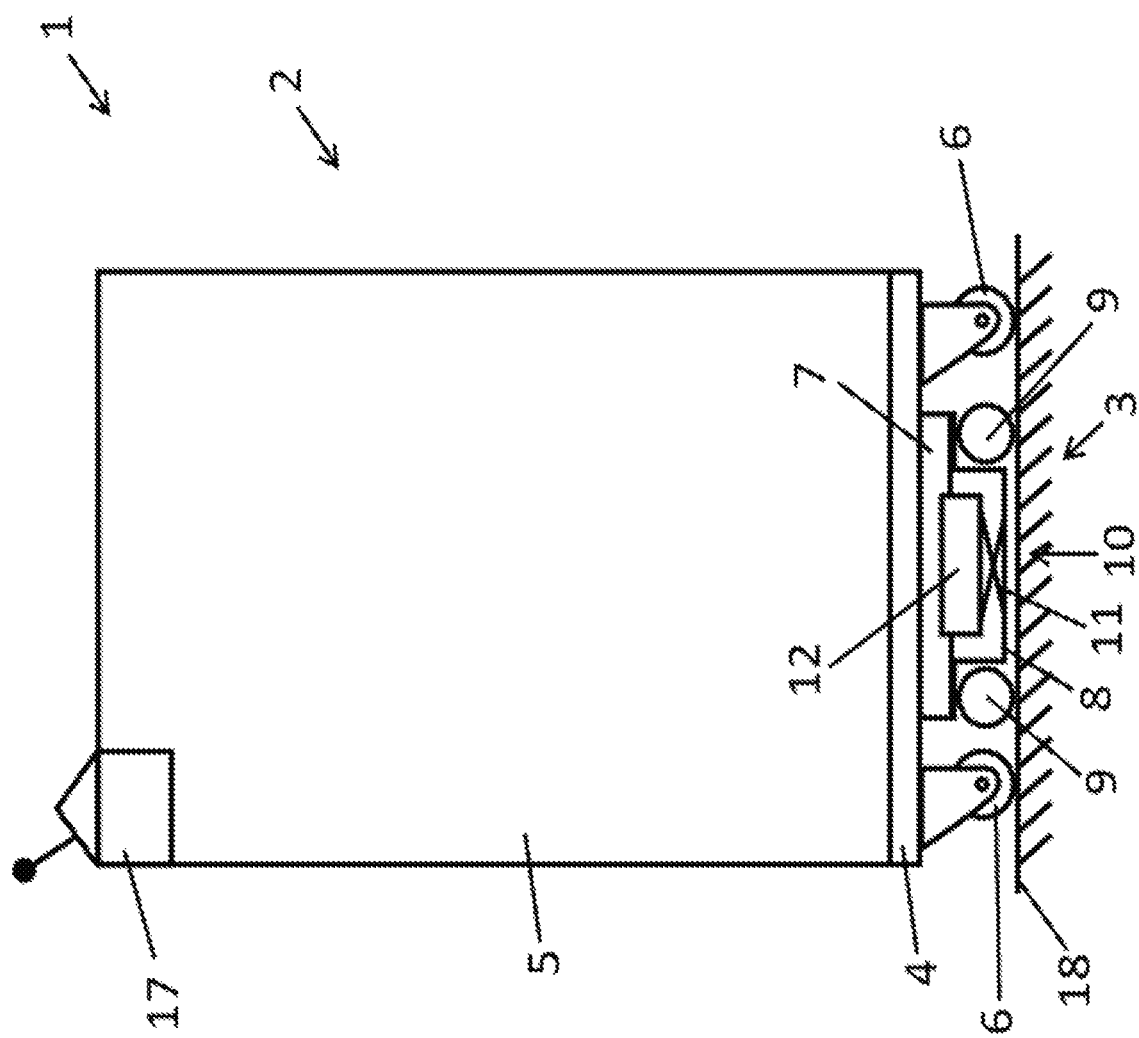
FIG. 1 shows a schematic side view of a trolley combination according to one embodiment of the disclosure herein.

The trolley combination 1 shown in FIG. 1 for an aircraft cabin has a conventional manually movable trolley 2 and an electrical operating apparatus 3 which is detachably coupled to the trolley and which can also be called an operating module. The trolley 2 is intended for use in an aircraft cabin and, in particular, for serving passengers and usually has a base section 4, a plurality of wheels 6 mounted on the bottom side of the base section, and a main section 5 which starts from the opposite top side of the base section. By way of example, four wheels 6 can be provided (see FIG. 2), only two of which four wheels are visible in FIG. 1. The trolley 2 can be supported on a floor 18 of the aircraft cabin by way of the wheels 6 and can itself then be pushed or pulled over the cabin floor 18 by the cabin crew in a rolling manner.

Figure 2:
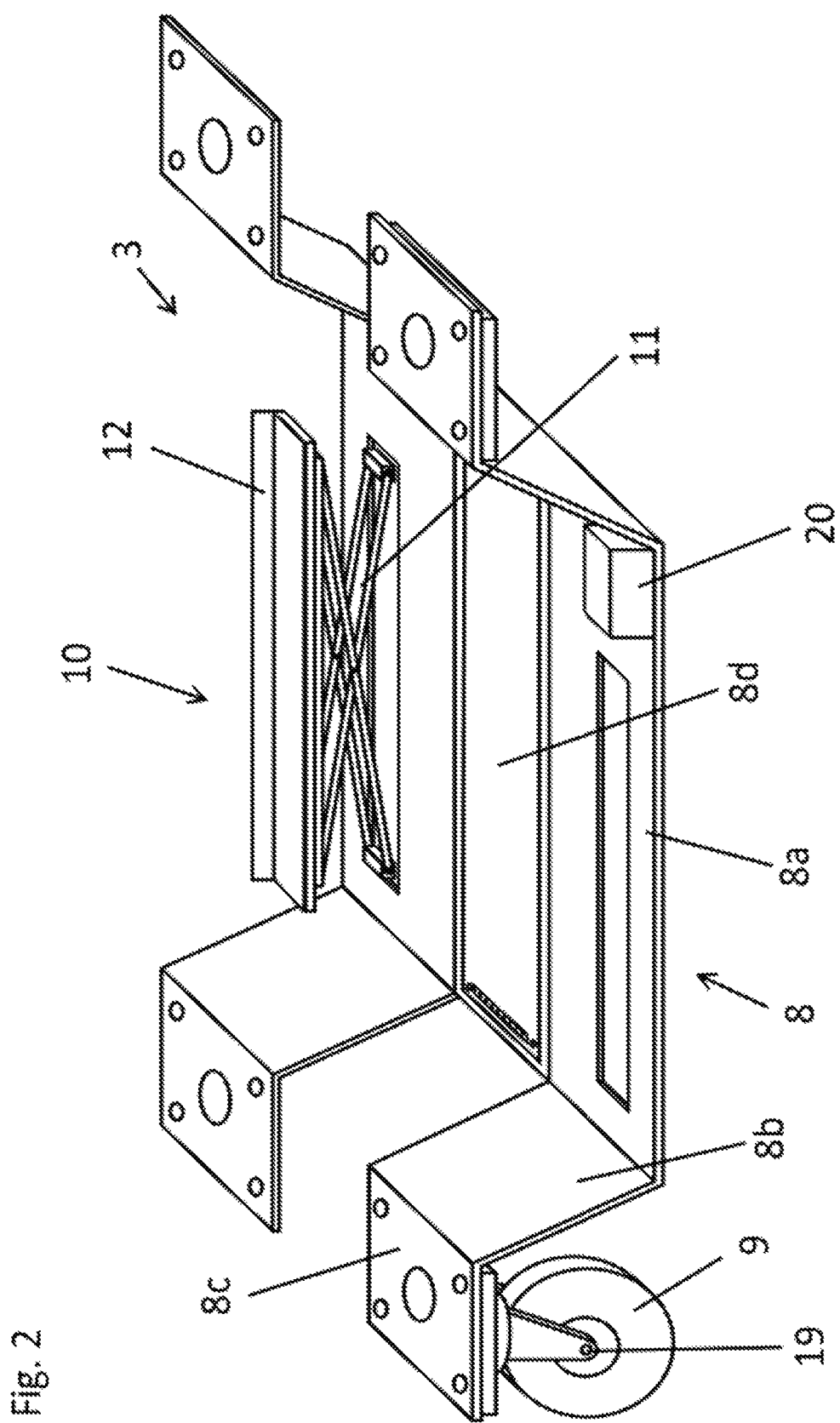
FIG. 2 shows a schematic perspective view of a portion of the electrical operating apparatus of the trolley combination of FIG. 1.

The electrical operating apparatus 3 is arranged beneath the bottom side of the base section 4 and is detachably coupled to the base section. The electrical operating apparatus has a frame 8, a plurality of wheels 9, two movement devices or movement sections 11 and two engagement sections 12, as is shown in detail in FIG. 2 (wherein only one movement device 11 and one engagement section 12 are shown there for reasons of clarity). The movement devices 11 and the engagement sections 12 are part of a coupling apparatus 10. Where the terms "downwards" and "upwards"

are used or orientations are described in the text which follows, reference is made to the orientation of the trolley combination 1 in FIG. 1, that is to say to the situation in which the operating apparatus 3 is supported on the cabin floor 18 by way of its wheels 9. In the example shown, the frame 8 has a plate-like and rectangular base section 8*a*, a connecting section 8*b* extending obliquely upwards from each of the four corners of the base section and merging with a fastening section 8*c* to which in each case one of the wheels 9 is fastened in such a way that the wheels extend downwards beyond the base section 8*a*. The wheels 9, of which four are provided but only one is shown in FIG. 2, therefore protrude downwards beyond the frame 8 and the base section 8*a* of the frame, so that the frame 8 is at a distance from the cabin floor 18 when the wheels 9 are in contact with the cabin floor 18. The base section 8*a* then runs parallel to the cabin floor 18, just like the four fastening sections 8*c*. As an alternative to the specific configuration shown in FIG. 2, in the illustrated embodiment the wheels 9 may also be constructed in an advantageous manner as omni wheels or Mecanum wheels, in order to provide an omni-directional drive, so that the operating apparatus 3 is steerable without a separate steering device.

A fastening region 8*d* for the combined battery, sensor and control block 13 illustrated in FIG. 3 which can be arranged and fastened on the fastening region 8*d* is provided as part of the base section 8*a*. The block 13 has a combined battery and control block 14 which contains both a rechargeable battery and also a control device. A charging device 15, which can be connected to an electrical power supply system for example, is provided for charging the battery. The control device is connected to a plurality of electric motors 19, 20, which together form an electrical drive device, and controls the operation of the electric motors. The block 13 also has four laser sensors 16*a*-16*d* which have an integrated sensor electronics system and detect properties of the area surrounding the operating apparatus 3 and send corresponding sensor signals to the control device. In particular, the laser sensors 16*a*-16*d* are adapted in order to identify the course of an aisle in an aircraft cabin, so that the control device is able, using the sensor signals, to actuate the electric motors 19 and to electrically move the trolley combination 1 along the aisle. An electric hub motor 19 which is connected to the control device and is controlled by the control device and with the aid of which the respective wheel 9 is electrically driven is arranged in each of the hubs of the four wheels 9.

The two movement devices 11 and the two engagement sections 12 together form a multi-part movement device or a multipartite engagement section. The two movement devices 11 are each designed as scissor lifting mechanisms and are fastened on the base section 8*a* of the frame 8 on opposite sides of the fastening region 8*d*. One of the two engagement sections 12, which are designed L profiles, is in each case fastened to the movement devices opposite the base section 8*a*. The two movement devices 11 are coupled to an electric motor 20 which is connected to the control device 14 and is controlled by the control device. The movement devices 11 can be moved with the aid of the electric motor 20 such that the two engagement sections 12 can be selectively moved between a first position, shown in FIG. 2, and a second position in the vertical direction. The engagement section 12 is further away from the base section 8*a* in the second position than in the first position. However, the movement devices 11 may also be constructed and configured differently and may comprise, for example, one or more spindle lift elements, one or more hydraulic cylinders, one or more telescopic cylinders, one or more spiral cylinders or helical band actuators, or one or more rotatably supported and rotatably drivable cam disks. FIG. 4*a* shows a variant in which the movement device 11 comprises, instead of the scissor lifting mechanism, multiple spindle lift elements 21. Each of the spindle lift elements 21 comprises a spindle or screw 22, which is connected to a respective one of the engagement sections 12 and is selectively movable axially upwardly and downwardly by a transmission 23 driven by the electrical drive device. FIG. 4*b* shows a further variant, in which the movement device 11 comprises multiple cam disks 24. Each of the cam disks 24 is rotatably mounted to the frame 8 and abuts a respective one of the engagement sections 12. They are shaped such that by rotating the cam disks 24 by the electrical drive device the engagement sections 12 are selectively moved upwardly and downwardly.

In this way, the operating device 3 with the engagement sections 12 in the first position of FIG. 2 can be arranged in the position beneath the trolley 2, as is shown in FIG. 1. The electric motor 20 is then controlled by the control device 14 such that the engagement sections 12 are moved upwards to the second position in which they act on opposite longitudinal edges of the base section 4. Because of the provision of two spaced-apart movement devices 11 and engagement sections 12, the base section 4 can have, for example, a downwardly directed projection 7 in its center. The second position is selected by the control device 14 such that a force which is directed vertically upwards is exerted onto the base section 4 and, in this way, the wheels 6 of the trolley 2 are relieved of part of the weight load of the trolley 2. As a result, the trolley 2 loads part of its weight onto the wheels 9 of the operating apparatus 3, so that the entire trolley combination 1 can be moved with the aid of the wheels 9. To this end, the hub motors 19 are actuated in a suitable manner by the control device 14.

The two engagement sections 12, which are configured as L profiles, may comprise a locking device by which the trolley 2 can be selectively clamped to and released from the engagement sections 12. As generally shown in FIG. 5*a*, which schematically shows in a simplified manner a side view of the trolley combination 1 of the type shown in FIG. 1, the L profiles 12 each comprise a lateral plate 25 between which plates 25 the lower end of the main section 5 of the trolley 2 is disposed. These plates 25 are mounted pivotably, so that they are pivotable between the locking position, which is shown in FIG. 5*a* and in which the clamp between them the main section 5, and the release position, which is shown in FIGS. 5*b* and 5*c* and in which they release the trolley 2. In this regard, FIG. 5*b* shows a variant in which the plates 25 are manually pivoted, wherein manually operable locking levers (not illustrated) may be provided for retaining the plates 25 in the locking position. FIG. 5*c* shows another variant, in which the plates 25 are pivoted out of the release position by the contact between the engagement sections 12 and the trolley 2. For this purpose, one or more cam elements 26 are provided on each of the engagement sections 12, which one or more cam elements 26 are secured at one end to the respective plate 25 and the opposite end 27 of which projects, in the release position, from a contact surface 28 provided by the respective engagement section 12. By placing the trolley 2 on the contact surface 28, the ends 27 are pressed downwardly, whereby a pivot movement into the locking position is transferred to the plates 25. It can also be taken from FIG. 5*a* that the trolleys 2 generally comprise a handle 29 for pushing, pulling and steering the trolley 2 or the trolley combination 1.

A remote control arrangement 17, which is connected to the control device 14, for example, wirelessly and can, for example, comprise a joystick and/or be fastened to the trolley 2, is provided for operator control of the abovementioned operation of the operating apparatus 3. The remote control arrangement 17 can be adapted, for example, to selectively send a start or stop signal to the control device 14, which control device then either starts up or switches off the hub motors 19, wherein the hub motors 19 lock the wheels 9 in the switched-off state. The control device 14 also takes into account the sensor signals from the sensors 16a-16d in order to move the trolley combination 1 independently along a cabin aisle.

While at least one exemplary embodiment of the present invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrically driven trolley combination for an aircraft cabin, the electrically driven trolley combination comprising:
   an independently usable, manually movable trolley for an aircraft cabin, the trolley comprising:
      a base section with a bottom side;
      a main section, which extends from the base section opposite to the bottom side; and
      a plurality of wheels, which at least partially protrude from the bottom side and are arranged such that the trolley can be supported on a cabin floor by the wheels and can be manually moved over the cabin floor by being pushed or pulled; and
   an electrical operating apparatus, which can be detachably coupled to the trolley and which comprises:
      a frame;
      a driveable rolling device mounted on the frame and by which the electrical operating apparatus can be supported on a cabin floor and can be moved over the cabin floor in a rolling manner;
      a coupling apparatus mounted on the frame for detachably coupling the electrical operating apparatus to the trolley and comprising an engagement section and a movement section, wherein the engagement section is selectively movable between a first position and a second position by the movement section, the engagement section being further away from the frame in the second position than in the first position;
      an electrical drive device configured to drive and brake the rolling device; and
      a control device configured to control the electrical drive device to automatically assist a movement of the trolley combination, when the trolley combination is being pushed, and to brake the rolling device in an absence of pushing.

2. The electrically driven trolley combination according to claim 1, wherein the coupling apparatus is configured such that, after the trolley is supported on a cabin floor by the wheels, the electrical operating apparatus with the engagement section in the first position can be arranged beneath the base section of the trolley such that the electrical operating apparatus is supported on the cabin floor by the rolling device, and the engagement section faces the bottom side of the base section of the trolley, and the engagement section then engages with the base section by moving to the second position, wherein the coupling apparatus exerts a force, which is directed away from the cabin floor, onto the base section in the second position of the engagement section, the force at least partially relieving a weight load of the trolley from the plurality of wheels of the trolley.

3. The electrically driven trolley combination according to claim 1, further comprising an electrical power supply device for supplying electrical power to the electrical drive device.

4. The electrically driven trolley combination according to claim 1, wherein the electrical drive device is configured to electrically drive the movement section.

5. The electrically driven trolley combination according to claim 1, wherein the movement section of the coupling apparatus has at least one scissor lifting mechanism, at least one spindle lift element, at least one hydraulic cylinder, at least one telescopic cylinder, at least one spiral cylinder or helical band actuator, or at least one rotatably supported and rotatably drivable cam disk.

6. The electrically driven trolley combination according to claim 1, wherein the engagement section has two L profiles which are at a distance from one another and which are configured to act on two opposite edges of the base section in the second position of the engagement section.

7. The electrically driven trolley combination according to claim 1, wherein the rolling device has a plurality of wheels, at least one wheel of which can be driven by the electrical drive device.

8. The electrically driven trolley combination according to claim 1, wherein the rolling device has a plurality of balls or rollers, at least one of which can be driven by the electrical drive device.

9. The electrically driven trolley combination according to claim 1, wherein the control device has an operator control device or is connected to an operator control device using cables or without cables.

10. The electrically driven trolley combination according to claim 1, wherein the electrical operating apparatus has a status display, which is connected to the control device and can be actuated by the control device, for displaying operating states of the operating device.

11. The electrically driven trolley combination according to claim 1, wherein the electrical operating apparatus further has a sensor arrangement which is connected to the control device and is configured to detect properties of an area surrounding the operating apparatus, wherein the control device is configured to move the trolley combination independently along an aisle of an aircraft cabin on a basis of sensor signals from the sensor arrangement.

12. A method of using an electrical operating apparatus having an independently usable, manually movable trolley for an aircraft cabin in a trolley combination, the method comprising:
   providing an independently usable, manually movable trolley for an aircraft cabin, the trolley comprising:
      a base section with a bottom side;
      a main section which extends from the base section opposite to the bottom side; and a plurality of wheels which at least partially protrude from the bottom side and are arranged such that the trolley can be supported on a cabin floor by the wheels and can be manually moved over the cabin floor by being pushed or pulled;

providing an electrical operating apparatus comprising:

a frame;

a driveable rolling device mounted on the frame and by which the electrical operating apparatus can be supported on a cabin floor and can be moved over the cabin floor in a rolling manner;

a coupling apparatus, which is mounted on the frame and comprises an engagement section and a movement section, wherein the engagement section is selectively movable between a first position and a second position by the movement section, the engagement section being further away from the frame in the second position than in the first position;

an electrical drive device that drives and brakes the rolling device; and a control device;

detachably coupling the electrical operating apparatus to the trolley using the coupling apparatus by moving the engagement section from the second position to the first position; and controlling, using the control device, the electrical drive device to automatically assist a movement of the trolley combination, when the trolley combination is being pushed, and to brake the rolling device in an absence of pushing.

13. The method according to claim 12, comprising:

after the trolley is supported on the cabin floor by the wheels, arranging the electrical operating apparatus, with the engagement section in the first position, beneath the base section of the trolley, such that the electrical operating apparatus is supported on the cabin floor by the rolling device and the engagement section faces the bottom side of the base section of the trolley; and moving the engagement section to the second position to engage with the base section of the trolley, such that the coupling apparatus exerts a force, which is directed away from the cabin floor, onto the base section of the trolley, the force at least partially relieving a weight load of the trolley from the wheels of the trolley.

\* \* \* \* \*